United States Patent
Wemple

[11] Patent Number: 5,638,928
[45] Date of Patent: Jun. 17, 1997

[54] BRAKE CENTER TRACKING ROLLER AND CAM ARRANGEMENT

[75] Inventor: Jonathan L. Wemple, Rochester Hills, Mich.

[73] Assignee: Rockwell International Corporation, Pittsburgh, Pa.

[21] Appl. No.: 568,692

[22] Filed: Dec. 7, 1995

[51] Int. Cl.$^6$ .................................................. F16D 51/22
[52] U.S. Cl. ........................................ 188/329; 188/250 F
[58] Field of Search ................................. 188/329, 325, 188/324, 330, 332, 338, 339, 340, 343, 250 C, 250 F, 106 F; 74/568 R, 838, 567, 569; 192/78, 93 R

[56] References Cited

U.S. PATENT DOCUMENTS

| 3,196,987 | 7/1965 | Moore et al. | 188/330 X |
|---|---|---|---|
| 3,275,103 | 9/1966 | Lyon | 188/332 |
| 3,469,660 | 9/1969 | Mathers | 188/330 |
| 4,624,348 | 11/1986 | Williams | 188/250 F |
| 4,807,729 | 2/1989 | Sampson | 188/330 |
| 4,932,505 | 6/1990 | Epperly | 188/330 |
| 5,255,763 | 10/1993 | Redgrave et al. | 188/250 F |

FOREIGN PATENT DOCUMENTS

| 2903965 | 8/1979 | Germany | 188/250 C |
|---|---|---|---|
| 4300540 | 7/1994 | Germany | 188/340 |
| 1396473 | 6/1975 | United Kingdom | 188/250 F |
| 2064687 | 6/1981 | United Kingdom | 188/329 |
| 1602333 | 11/1981 | United Kingdom | 188/250 C |

*Primary Examiner*—Douglas C. Butler

[57] ABSTRACT

A vehicle wheel drum brake assembly includes an improved brake actuator assembly having a stabilizing cam and roller design. The cam and roller include a centering and guiding surface that cooperate to prevent relative movement between the cam and the rollers in an axial direction which is generally perpendicular to a direction of movement of the brake shoes caused by the cam camming the rollers. The rollers and brake shoes are provided with similarly cooperating centering and guiding surfaces to prevent undesirable relative movement between the shoes and rollers. The centering and guiding surfaces include non-parallel sidewalls such that a wedge of surface contact is provided. The centering and guiding surfaces provide a centering feature and increase the amount of surface contact and the amount of desirable friction experienced in the system.

20 Claims, 1 Drawing Sheet

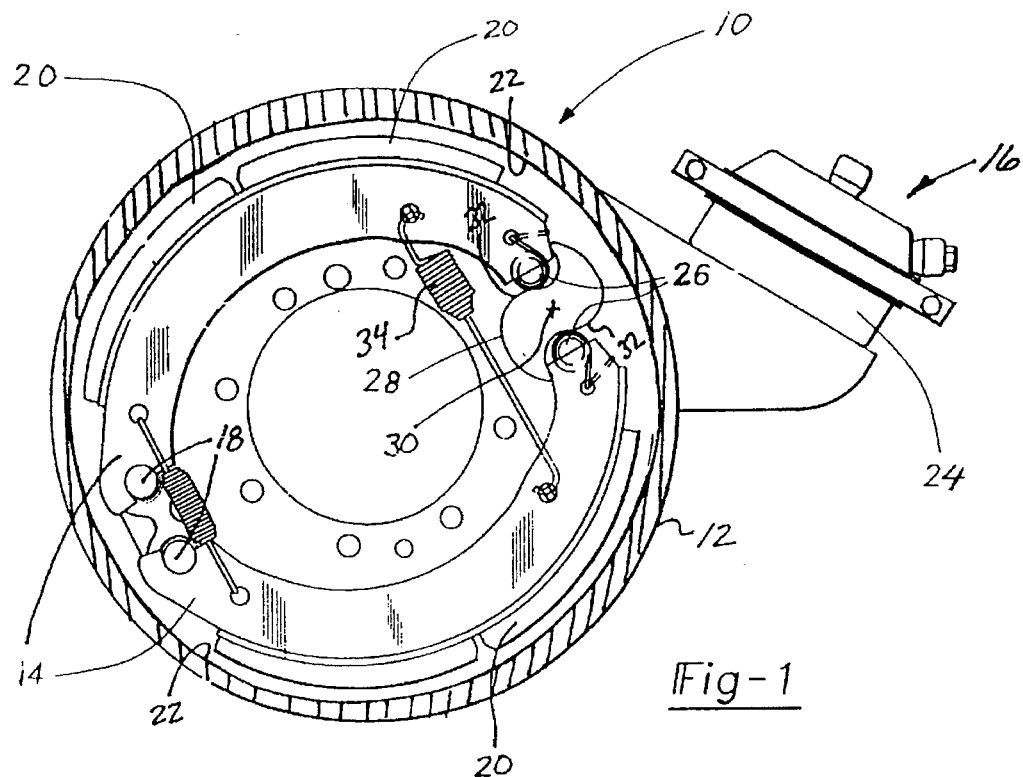
Fig-1
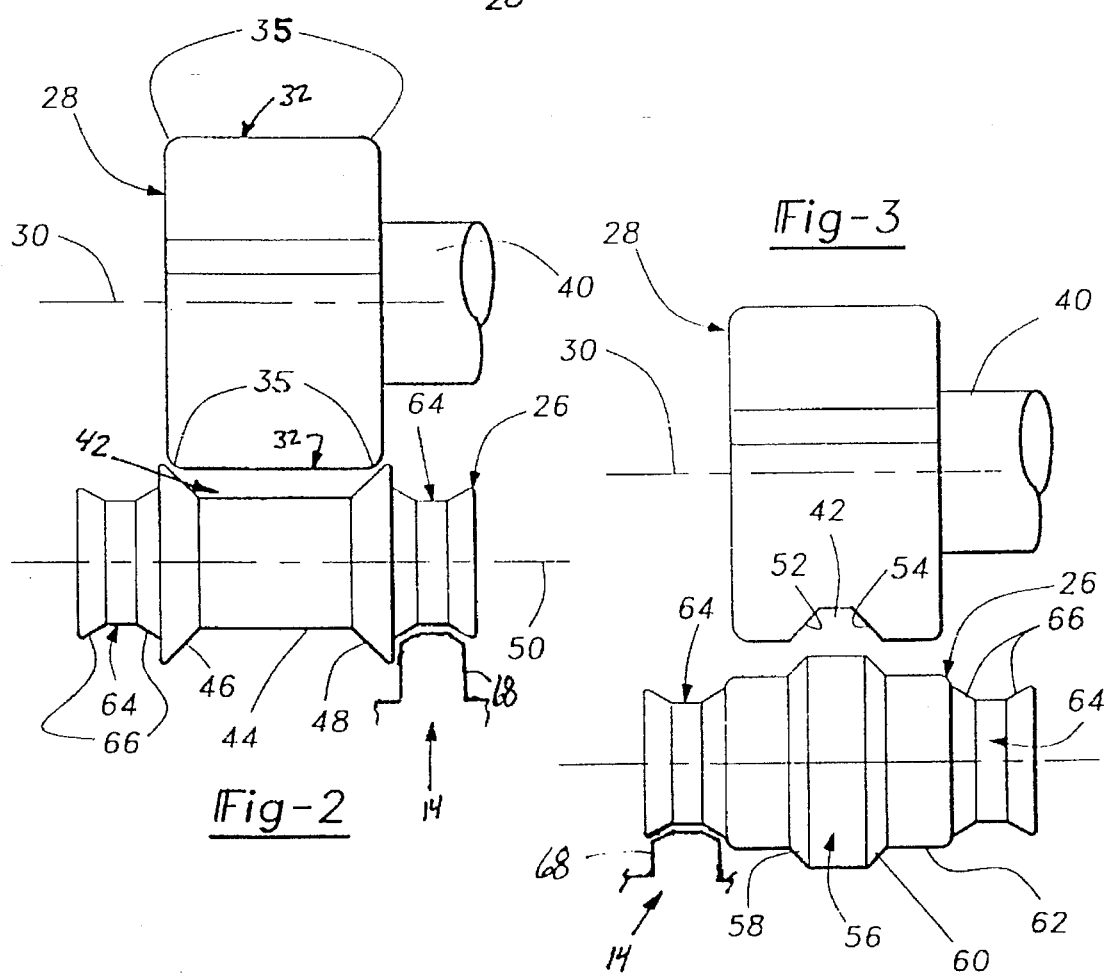
Fig-2
Fig-3

BRAKE CENTER TRACKING ROLLER AND CAM ARRANGEMENT

BACKGROUND OF THE INVENTION

This invention relates to vehicle brake systems and, more particularly, to a center tracking roller and cam arrangement for maintaining vehicle wheel brake components in a preferred alignment during braking applications.

Heavy duty vehicles such as trucks typically include drum brake assemblies. Although drum brake assemblies are well known, those skilled in the art are constantly trying to improve performance characteristics. One problem encountered in drum brake assemblies is the occurrence of undesirable noise or brake chatter. Brake chatter is a phenomena caused by the relatively large forces imposed upon the various components of a drum brake assembly. If the components of a drum brake assembly do not fit together with relatively tight tolerances, they tend to rattle undesirably and create noise. Although attempts have been made at providing closer-fitting and quieter components, no effective and economically feasible arrangements have been developed prior to this invention.

In one well known type of brake assembly, an S-cam is rotated to cam opposed rollers between actuated and non-actuated positions. Brake shoes move with the rollers to actuate the brakes. It is most important that the cam/roller/brake shoe interface provide a tight fit. Clearance between the cam, rollers and brake shoes results in relative side-to-side motion, sliding, and brake chatter.

This invention provides a vehicle wheel drum brake assembly having a center tracking roller and cam arrangement that operates to maintain the brake shoes, the cam and the roller in an appropriate alignment by providing a zero clearance joint between the brake shoes, cam and roller. This invention further provides a more reliable cam actuated drum brake assembly.

SUMMARY OF THE INVENTION

In general terms, this invention provides a vehicle brake assembly that includes a drum and two brake shoes having braking surfaces that are adapted to contact an inner surface of the drum during a braking application. Two rollers are also included. Each of the rollers are supported at one end of one of the brake shoes, respectively. A cam is disposed between the rollers for camming the rollers to thereby move the brake shoes into contact with the inner surface of the drum during a braking application. The cam, rollers and brake shoes include centering and guiding surfaces that cooperate to prevent relative movement between the cam, rollers and brake shoes in an axial direction that is generally perpendicular to a direction of movement of the brake shoes caused by the camming of the cam against the rollers.

In preferred embodiments the centering and guiding surfaces include a groove on either the cam or rollers having non-parallel sidewalls. The other of the cam and rollers is spring biased into this groove to create a wedging effect. Moreover, the rollers preferably include a wedge-shaped groove that is biased onto a corresponding surface of the brake shoe.

The various features and advantages of this invention will become apparent to those skilled in the art from the following detailed description of the preferred embodiments. The drawings that accompany the detailed description are described as follows.

BRIEF DESCRIPTION OF THE DRAWINGS

FIG. 1 is a partial cross-sectional elevational view of a drum brake assembly designed in accordance with this invention.

FIG. 2 is an elevational view showing a roller and cam designed in accordance with this invention.

FIG. 3 is an elevational view showing a second embodiment of a roller and cam combination designed in accordance with this invention.

DETAILED DESCRIPTION OF THE PREFERRED EMBODIMENTS

FIG. 1 illustrates a vehicle drum brake assembly 10 including a drum 12, brake shoes 14 and an actuator assembly 16. The actuator assembly 16 causes the brake shoes 14 to pivot about pivot points 18 to thereby move brake pads 20 into contact with an inner portion or braking surface 22 on the drum 12. The actuator assembly 16 includes a known brake actuator 24, which operates in a conventional manner. Two rollers 26 are provided, each one at an end of the brake shoes 14 opposite from the pivot points 18. The rollers 26 are supported on the end of the brake shoes 14 as will be described in more detail below. An S-shaped cam 28 is disposed between the two rollers 26. The S-shaped cam 28 pivots about a cam pivot axis 30 so that a camming surface 32 bears against the rollers 26 to cause the brake shoes 14 to pivot about the pivot points 18 against the bias of a spring 34. The same spring 34 biases the rollers against the camming surface 32.

FIG. 2 illustrates, in more detail, a preferred embodiment of a roller 26 and a cam 28. The cam 28 includes a cam shaft 40, which mounts the cam 28 within the drum brake assembly such that it pivots about the pivot axis 30 in a stable manner. In the embodiment of FIG. 2, the roller 26 includes a centering surface or groove 42. The groove 42 is defined by a longitudinal midsection 44 on the roller 26. At each end of the longitudinal midsection 44 is a radially extending projection. The radially extending projections include non-parallel sidewalls 46 and 48. As can be appreciated from the illustration, the sidewalls protrude radially away from the center of the roller 26 at an angle such that the sidewalls 46 and 48 are non-parallel and not perpendicular to a roller axis 50. The sidewalls 46 and 48 extend toward each other in an inward direction toward a central axis of roller 26 such that a wedge surface is provided.

In the embodiment of FIG. 2, the cam 28 has a generally chamfered or rounded edge 35 at each longitudinal end of the cam 28. The chamfered edges 35 of the cam 28 define the portion of the camming surface 32 that engages the non-parallel sidewalls 46 and 48 on the roller 26. As can be appreciated from the illustration, the non-parallel sidewalls and the camming surface cooperate to eliminate any axial movement of the cam 28 relative to the roller 26. When assembled, spring 34 biases rollers 26 against surface 32 of cam 28. Edges 35 are wedged against sidewalls 46 and 48 to eliminate clearance.

FIG. 3 illustrates a second preferred embodiment of a cam 28 and a roller 26. In the embodiment of FIG. 3, the cam 28 includes a centering surface or groove 42. The cam groove includes non-parallel sidewalls 52 and 54, which extend generally radially inward toward the cam pivot axis 30, and toward each other. In this embodiment, the sidewalls 52 and 54 define the camming surface 32. The roller 26 includes a central raised bead portion 56. The bead 56 includes non-parallel end walls 58 and 60. As can be appreciated from the illustration, the end walls 58 and 60 extend angularly away from a generally cylindrical body portion 62 of the roller 26. In this embodiment, the end walls 58 and 60 are biased against the sidewalls 52 and 54, respectively. Accordingly, bead 56 is wedged, at least partially, within the centering groove 42 and, therefore, is appropriately referred to as a guide member 56.

The arrangement illustrated in FIG. 2 or 3 eliminates any side-to-side or axial motion of the roller 26 relative to the cam 28. Further, the non-parallel sidewall arrangements increase the contact surface between the cam 28 and the rollers 26, which increases the friction between the cam 28 and the rollers 26, thereby reducing the tendency for the two components to rotationally slide undesirably. Accordingly, a cam and roller arrangement designed in accordance with this invention provides the advantage of having a more reliable brake actuator assembly.

A further enhancement of a roller 26 designed in accordance with this invention is illustrated in FIGS. 2 and 3. At each longitudinal end of the roller 26 a generally wedge-shaped recess 64 is provided. The wedge-shaped recess 64 includes non-parallel sidewalls 66. The end of the brake shoes 14, which are opposite the brake shoe pivot points 18, are at least partially wedged within the wedge-shaped recesses 64 such that a portion of the brake shoe 68 engages the non-parallel sidewalls 66. The spring 34 biases the shoe portions 68 into the grooves 64. (Only one shoe portion 68 is illustrated partially in each of FIGS. 2 and 3.) This arrangement provides a centering effect similar to that described above with respect to the cam and the roller. Accordingly, a cam 28, roller 26 and brake shoes 14 designed in accordance with this invention are provided with a zero clearance joint between the brake shoes, cam and roller. Such an arrangement is effective to eliminate brake chatter or undesirable noise that is otherwise experienced when using cam-actuated drum brakes.

The foregoing description is exemplary rather than limiting in nature. Variations and modifications of the disclosed embodiments will become apparent to those skilled in the art that do not depart from the purview and spirit of this invention. The scope of this invention is to be limited only by the appended claims.

What is claimed is:

1. A vehicle brake assembly, comprising:
a drum;
two brake shoes disposed within said drum having braking surfaces adapted to contact and inner portion of said drum during a braking application;
two rollers, each of said rollers being supported at one end of one of said brake shoes, respectively;
a cam disposed between said rollers for camming said rollers to thereby move said brake shoes into contact with said inner portion of said drum during a braking application; and
a spring for biasing said shoes into said rollers and said rollers into said cam and wherein said cam and said rollers include centering and guiding surfaces, said centering surface having two non-parallel sidewalls extending in a radial direction, said non-parallel sidewalls and said guiding surface cooperating to prevent relative axial movement between said cam and said rollers in an axial direction that is generally perpendicular to a rotational direction of movement caused by said camming.

2. The assembly of claim 1, wherein said centering surface is a groove defined along a portion of an outer periphery on one of said cam or said rollers.

3. The assembly of claim 2, wherein the other of said cam or said rollers include said guiding surface that is at least partially received within said groove.

4. The assembly of claim 3, wherein said two non-parallel sidewalls of said groove extend radially inward from said outer periphery.

5. The assembly of claim 4, wherein said centering surface is defined on said cam and includes said groove which defines a camming surface.

6. The assembly of claim 5, wherein said guiding surface includes a radial projection having two non-parallel endwalls that extend radially outward from outer peripheries on said rollers such that said radial projections are biased into said groove.

7. The assembly of claim 3, wherein said rollers each include said centering surface which comprises said groove defined along an outer periphery of said rollers.

8. The assembly of claim 7, wherein said cam is received within said groove.

9. The assembly of claim 7, wherein each said roller has a generally cylindrical outer periphery along a longitudinal midsection of each said roller and a radially raised portion at each end of said longitudinal midsection extending generally away from said midsection defining said groove.

10. The assembly of claim 9, wherein said radially raised portions include said non-parallel sidewalls and wherein said cam contacts said sidewalls.

11. The assembly of claim 10, wherein said cam includes said centering surface which comprises a chamfered camming surface along at least a portion of a periphery around said cam at opposite longitudinal ends on said cam, said camming surface being biased between said sidewalls.

12. The assembly of claim 1, wherein said rollers each have opposite longitudinal ends that include a generally wedge-shaped recess at each said end, each said recess having two non-parallel sidewalls extending radially inward, a portion of said brake shoes being biased against and received between said non-parallel sidewalls.

13. A device for actuating a vehicle wheel drum brake assembly, comprising:
a generally S-shaped cam; and
two rollers, adapted to be respectively supported at an end of a brake shoe, spring biased against said cam, said cam camming said rollers to thereby actuate the brake assembly, said cam and said rollers having a centering track that includes two non-parallel sidewalls and a cooperating guide member that includes two non-parallel endwalls and is received within said track such that a portion of said sidewalls engage a portion of said endwalls for maintaining an axial alignment of said cam and said rollers during said camming.

14. The device of claim 13, wherein one of said rollers and said cam include said centering track, which comprises a groove, and the other has a guide member surface spring biased into said groove.

15. The device of claim 14, wherein said groove extends radially inwardly along a portion of an outer periphery on said cam and wherein each said roller respectively includes a guide member defined by a raised bead around an outer periphery on each said roller, said raised bead having two non-parallel endwalls extending radially away from said outer periphery of each said roller, said bead endwalls being biased against said groove sidewalls to thereby maintain said rollers and said cam in said axial alignment.

16. The device of claim 14, wherein said groove is defined on each said roller and wherein said non-parallel sidewalls extend radially outward from a generally cylindrical midportion of each said roller and said cam includes a camming surface that is biased against said sidewalls.

17. A vehicle brake assembly, comprising:
two brake shoes;
a moving member for moving said brake shoes during a braking application; and two rollers supported between said brake shoes and said moving member, each said roller having opposite longitudinal ends that include a generally wedge-shaped recess at each said end, each said recess having two non-parallel, opposed sidewalls extending radially inward, said sidewalls being biased directly against a portion of said brake shoes.

18. The assembly of claim 17, further comprising a spring for biasing said portion of said brake shoes into said wedge-shaped recesses.

19. The assembly of claim 18, wherein said moving member comprises a cam for camming against said rollers and wherein one of said cam and said rollers includes a groove and the other includes a surface held in said groove by the bias of said spring, said groove having non-parallel sidewalls such that said surface is wedged into said groove.

20. A vehicle brake assembly, comprising:

a drum;

two brake shoes disposed within said drum having braking surfaces adapted to contact an inner portion of said drum during a braking application;

two rollers, each of said rollers being supported at one end of one of said brake shoes, respectively;

a cam disposed between said rollers for camming said rollers to thereby move said brake shoes into contact with said inner portion of said drum during a braking application;

a spring for biasing said shoes into said rollers into said cam; and wherein said cam includes a guiding surface and said rollers each include a centering surface comprising a groove defined along a portion of an outer periphery of said rollers, said rollers having a generally cylindrical outer periphery along a longitudinal midsection of each said roller and a radially raised portion at each end of said longitudinal midsection extending generally away from said midsection defining said groove, said guiding surface being at least partially received within said groove to prevent relative movement between said cam and said rollers in an axial direction that is generally perpendicular to a direction of movement caused by said camming.

\* \* \* \* \*